United States Patent
Xu et al.

(10) Patent No.: US 12,053,823 B2
(45) Date of Patent: Aug. 6, 2024

(54) MANUFACTURING METHOD OF DIAMOND POROUS GRINDING BLOCK BASED ON 3D PRINTING AND APPLICATION THEREOF

(71) Applicant: HUAQIAO UNIVERSITY, Quanzhou (CN)

(72) Inventors: Yangli Xu, Quanzhou (CN); Jinquan Wei, Quanzhou (CN); Guoqin Huang, Quanzhou (CN); Yuanqiang Tan, Quanzhou (CN); Zhongwei Hu, Quanzhou (CN); Peihui Luo, Quanzhou (CN)

(73) Assignee: HUAQIAO UNIVERSITY, Quanzhou (CN)

( * ) Notice: Subject to any disclaimer, the term of this patent is extended or adjusted under 35 U.S.C. 154(b) by 0 days.

(21) Appl. No.: 18/355,393

(22) Filed: Jul. 19, 2023

(65) Prior Publication Data
US 2024/0024952 A1   Jan. 25, 2024

(30) Foreign Application Priority Data
Jul. 20, 2022   (CN) .......................... 202210856780.4

(51) Int. Cl.
*B24D 3/10*     (2006.01)
*B22F 1/142*   (2022.01)
(Continued)

(52) U.S. Cl.
CPC .............. *B22F 10/80* (2021.01); *B22F 1/142* (2022.01); *B22F 10/28* (2021.01); *B24D 3/10* (2013.01);
(Continued)

(58) Field of Classification Search
CPC .......... B22F 1/142; B22F 10/28; B22F 10/80; B22F 2301/052; B22F 2302/406;
(Continued)

(56) References Cited

FOREIGN PATENT DOCUMENTS

| CN | 106944619 A | * | 7/2017 |
|---|---|---|---|
| CN | 106944619 A | | 7/2017 |

(Continued)

OTHER PUBLICATIONS

"How to Create a Gyroid Surface in SolidWorks" by A11 at https://www.youtube.com/watch?v=PJovx-ytJYI (Aug. 4, 2023) (Year: 2023).*

*Primary Examiner* — Pegah Parvini

(57) ABSTRACT

A manufacturing method of a diamond porous grinding block based on 3D printing. The manufacturing method includes designing a 3D printing model of a grinding block unit cell with an adjustable porosity according to an internal cooling space for abrasive debris required in a grinding process, importing the 3D printing model of the grinding block unit cell into a MAGICS software, filling a frame of a 3D printing model of a diamond porous grinding block with a plurality of 3D printing models of grinding block unit cells; preparing mixed powder of diamond abrasive particles and an aluminum alloy binder as printing powder, performing 3D printing to the 3D printing model of the diamond porous grinding block by an SLM technology to obtain the diamond porous grinding block. The diamond porous grinding block is configured to form a diamond structure grinding disc for grinding a semiconductor substrate.

5 Claims, 3 Drawing Sheets

(51) Int. Cl.
  *B22F 10/28* (2021.01)
  *B22F 10/80* (2021.01)
  *B33Y 10/00* (2015.01)
  *B33Y 40/10* (2020.01)
  *B33Y 50/00* (2015.01)
  *B33Y 80/00* (2015.01)
  *E21B 10/46* (2006.01)

(52) U.S. Cl.
  CPC ... *B22F 2301/052* (2013.01); *B22F 2302/406* (2013.01); *B33Y 10/00* (2014.12); *B33Y 40/10* (2020.01); *B33Y 50/00* (2014.12); *B33Y 80/00* (2014.12)

(58) Field of Classification Search
  CPC .......... B24D 3/10; B33Y 10/00; B33Y 40/10; B33Y 50/00; B33Y 80/00
  See application file for complete search history.

(56) References Cited

FOREIGN PATENT DOCUMENTS

| | | | | |
|---|---|---|---|---|
| CN | 107914216 A | | 4/2018 | |
| CN | 108486429 A | * | 9/2018 | |
| CN | 110453112 A | * | 11/2019 | ............ B22F 1/0003 |
| CN | 110453112 A | | 11/2019 | |
| CN | 112008081 A | * | 12/2020 | ............... B22F 3/11 |
| CN | 112008081 A | | 12/2020 | |
| CN | 113151722 A | | 7/2021 | |
| CN | 214980196 U | | 12/2021 | |
| WO | 2021227539 A1 | | 11/2021 | |

* cited by examiner

MANUFACTURING METHOD OF DIAMOND POROUS GRINDING BLOCK BASED ON 3D PRINTING AND APPLICATION THEREOF

TECHNICAL FIELD

The present disclosure relates to a technical field of engineering application of semiconductor wafer grinding, and in particular to a manufacturing method of a diamond porous grinding block based on three-dimensional (3D) printing and an application thereof.

BACKGROUND

Semiconductor wafers are applied in chips. The semiconductor wafers are mainly made of semiconductor materials such as sapphire, silicon carbide, and diamond, which have characteristics of high hardness, high brittleness, good wear resistance, and good corrosion resistance. As materials for manufacturing the semiconductor wafers of the chips, the semiconductor materials each requires a certain level of flatness on a surface thereof, as well as a smooth, low-damage surface quality. A processing of the semiconductor wafers comprises steps such as wire sawing of ingots, double-sided grinding of wafers, and precision polishing. The step of double-sided grinding is an important process for obtaining flat and smooth surfaces of the semiconductor wafers, and a grinding tool thereof is a double-sided grinding disc. The double-sided grinding disc is generally assembled by splicing a plurality of grinding blocks.

At present, there are mainly three methods for double-sided grinding of the semiconductor wafers, which are respectively a free abrasive grinding method, a semi-consolidated abrasive grinding method, and a consolidated abrasive grinding method.

Among them, the free abrasive grinding method has problems such as low grinding efficiency, high surface roughness of ground semiconductor wafers, low utilization rate of abrasives, and environmental pollution. The semi-consolidated abrasive grinding method improves the grinding efficiency and an surface accuracy of the ground semiconductor wafers to a certain extent, but an improvement range thereof is relatively limited, and a grinding tool thereof is difficult to repair and maintain. The consolidated abrasive grinding method has high grinding efficiency, realizes rapid thinning of the semiconductor wafers, and has a good application prospect. However, a consolidated abrasive grinding block is mainly prepared by pressing and sintering, and is generally a dense block structure. In the double-sided grinding of the semiconductor wafers, the consolidated abrasive grinding block hardly provides a flowing space for cooling liquid. At the same time, abrasive debris often adhere to surfaces of the consolidated abrasive grinding block, resulting in grinding blockage and failure of a grinding disc thereof formed by the consolidated abrasive grinding blocks. Thus, the grinding disc thereof formed by the consolidated abrasive grinding blocks needs to be repaired and maintained frequently in the later stage, and a workload is relatively large.

In order to solve above problems of the grinding disc, a current method is to cut grooves on surfaces of the consolidated abrasive grinding blocks, so that the cooling fluid flows in the grooves and takes away fallen abrasive grains and the abrasive debris during the double-sided grinding of the semiconductor wafers. The consolidated abrasive grinding blocks with the grooves are verified to be effective. However, the cooling fluid and the abrasive debris only flow on the surfaces of the consolidated abrasive grinding blocks. When sizes of the grooves are too large, it also adversely affects processing efficiency of the semiconductor wafers. Therefore, it is a development trend to manufacture the consolidated abrasive grinding blocks of the grinding disc to have holes communicated in a 3D space.

SUMMARY

In view of defects in the prior art, an object of the present disclosure is to provide a manufacturing method of a diamond porous grinding block based on three-dimensional (3D) printing and an application thereof.

To achieve the above object, the present disclosure provides the manufacturing method of the diamond porous grinding block based on 3D printing. The manufacturing method comprises:

S1: designing a porosity of a grinding block unit cell according to an internal cooling space for abrasive debris required in a grinding process, and obtaining a 3D printing model of the grinding block unit cell with the porosity by a designing software based on a mathematical function relationship;

S2: creating a frame of the diamond porous grinding block in a MAGICS software, filling the frame of the diamond porous grinding block with a plurality of 3D printing models of grinding block unit cells; determining a size of the frame of the diamond porous grinding block to obtain a 3D printing model of the diamond porous grinding block; and S3: preparing mixed powder of diamond abrasive particles and an aluminum alloy binder as printing powder, performing 3D printing to the 3D printing model of the diamond porous grinding block by a selective laser melting (SLM) technology; wherein a volume fraction of the diamond abrasive particles is 10%-30%.

Optionally, a laser power of the SLM technology is 200-400 W. A scanning speed is 2500-3500 mm/s. A scanning interval is 100-150 μm. A spot diameter is 70-90 μm.

Optionally, the step S1 comprises:

S11: selecting a mathematical function Gyroid as a curved function for generating the 3D printing model of the grinding block unit cell; and modeling in a MATLAB software to obtain a 3D model of the grinding block unit cell with the porosity in an STL format; and S12: importing the 3D model of the grinding block unit cell in the STL format into a SOLIDWORKS software to obtain the 3D printing model of the grinding block unit cell.

Optionally, the step S11 comprises establishing a cube point set according to predetermined value ranges of x, y, and z; obtaining an equivalent surface by an isosurface function according to a curved surface expression; and closing the 3D model of the grinding block unit cell in the STL format by an isocaps function.

Optionally, the porosity of the grinding block unit cell is 0.3-0.8.

Optionally, in the step S3, an average particle size of the diamond abrasive particles is 40-80 μm. The aluminum alloy binder is AlSi$_7$Mg. The mixed powder is prepared by mechanical mixing the diamond abrasive particles with the aluminum alloy binder. A mixing time is 8-15 hours.

Optionally, the mixed powder is dried in a vacuum drying oven before 3D printing. A drying temperature is 80-100° C. A drying time is 8-15 hours.

The present disclosure further provides a diamond porous grinding block manufactured by the manufacturing method mentioned above. The diamond porous grinding block comprises holes communicated with each other in a 3D space.

The present disclosure further provides a diamond structure grinding disc for grinding a semiconductor substrate. The diamond structure grinding disc comprises a plurality of diamond porous grinding blocks mentioned above. The plurality of diamond porous grinding blocks are built up to form the diamond structure grinding disc.

Optionally, each of the diamond porous grinding blocks is hexahedron, octahedron, or dodecahedron.

Furthermore, the diamond porous grinding block is manufactured by 3D printing and is applied to grind the semiconductor substrate. The diamond porous grinding block comprises the plurality of grinding block unit cells. Each of the grinding block unit cells is designed based on the internal cooling space for the abrasive debris required in the grinding process. The 3D printing model of each of the grinding block unit cells is obtained by modeling in the MATLAB software based on the mathematical function relationship. The porosity of each of the grinding block unit cells is adjusted according to processing conditions (such as a size of the abrasive debris and a flowing space of the cooling liquid). Then, the 3D printing model of the grinding block unit cell with the porosity that is adjustable is obtained through processing in the SOLIDWORKS software. The 3D printing models of the grinding block unit cells are capable of being processed by a 3D printing manufacturing device according to the SLM technology. Then 3D printing models of the grinding block unit cells are built up to obtain the 3D printing model of the diamond porous grinding block by the MAGICS software. Finally, the 3D printing model of the diamond porous grinding block is printed by the SLM technology.

The holes having high efficiency of the diamond structure grinding disc enables cutting fluid (i.e., the cooling liquid) to flow in multi-dimensional directions with low resistance. The holes increase a special self-sharpening property of the diamond porous grinding block, increase grinding efficiency, and thus effectively exerting cooling performance, lubricating performance, and antirust performance of the cutting fluid. The diamond structure grinding disc also provides an extra cutting edge required in the grinding process, which increases fluidity of the cutting fluid and significantly improves processing efficiency.

The grinding block unit cells comprise the holes, which provide sufficient flowing space for the cooling liquid. The abrasive debris are allowed to flow away from the holes during the grinding process of the semiconductor substrate. At the same time, the porosity of each of the grinding block unit cells is adjusted freely. A structure of each of the grinding block unit cells is designed according to the processing conditions (such as the size of the abrasive debris and the flowing space of the cooling liquid). The present disclosure has great significance in improving grinding efficiency and processing efficiency of the semiconductor substrate.

DETAILED DESCRIPTION

The present disclosure will be further explained below in conjunction with the accompanying drawings and specific embodiments. The drawings of the present disclosure are only schematic diagrams for well understanding of the present disclosure, and specific proportions thereof can be adjusted according to design requirements.

The present disclosure further provides a diamond porous grinding block for grinding a semiconductor substrate. The diamond porous grinding block comprises grinding block unit cells. A three-dimensional (3D) model of each of the grinding block unit cells is modeling in a MATLAB software according to a mathematical function Gyroid. An editable code of an advanced program of the mathematical function Gyroid accurately identifies and processes the mathematical function Gyroid to generate the 3D model of the grinding block unit cell with the porosity that is adjustable in an STL format. The porosity of the grinding block unit cell is determined according to grinding and flowing requirements. Next, a series of processes is performed by a 3D modeling processing software (i.e., SOLIDWORKS software) to obtain a 3D printing model of the grinding block unit cell with the porosity that is adjustable. The 3D printing model of the grinding block unit cell is capable of being processed by a selective laser melting (SLM) printing manufacturing device. 3D printing models of the grinding block unit cells are built up to form a 3D printing model of the diamond porous grinding block by a print debugging software (i.e., a MAGICS software).

Specifically, a tool creation command in a task menu bar of the MAGICS software is adopted to create a frame of the diamond porous grinding block. The frame of the diamond porous grinding block is a hexahedron, a octahedron, a dodecahedron, or etc. Then, a structure of the 3D printing models of the grinding block unit cells is selected and imported into the MAGICS software. Finally, a size of the frame of the diamond porous grinding block is determined to obtain the 3D printing model of the diamond porous grinding block Laser printing is carried out to obtain one diamond porous grinding block, and then a plurality of diamond porous grinding blocks are built up to form a diamond structure grinding disc for grinding the semiconductor substrate.

A design concept of the diamond porous grinding block is based on a special function of the MAGICS software that generates a 3D solid model for a multi-dimensional surface in a mathematical function space base on a program code and a 3D digital model. The mathematical function Gyroid is selected as a curved function for generating the 3D printing model of the grinding block unit cell.

Figure 1A:
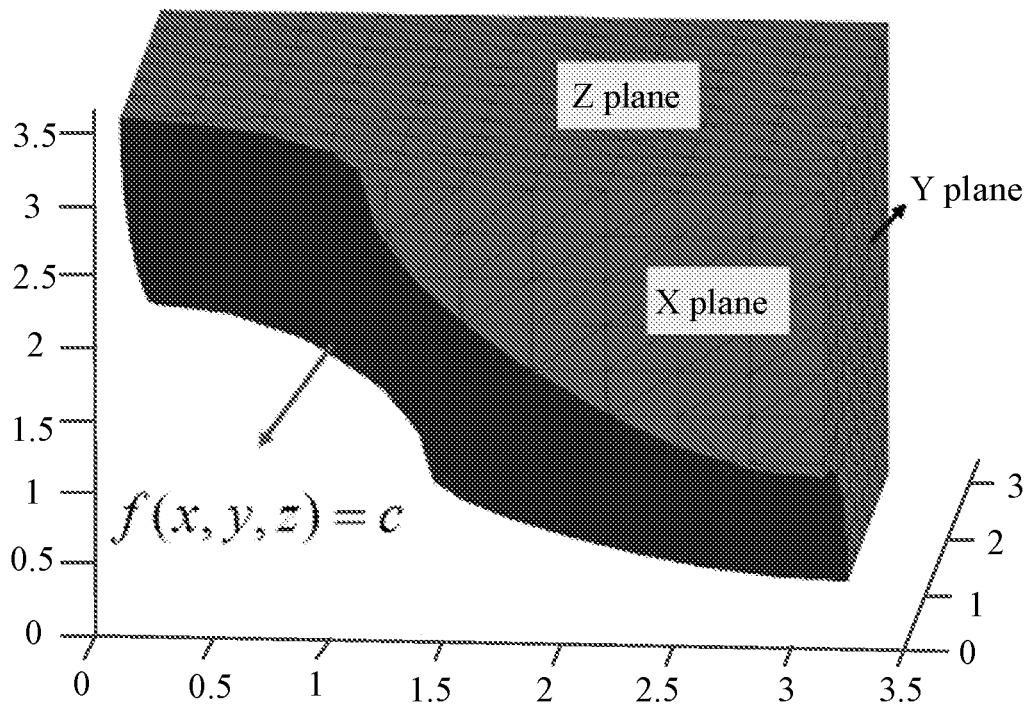
FIG. 1A is a schematic diagram showing a principle of generating a 3D printing model of a grinding block unit cell corresponding to a mathematical function Gyroid according to one embodiment of the present disclosure.
Figure 1B:
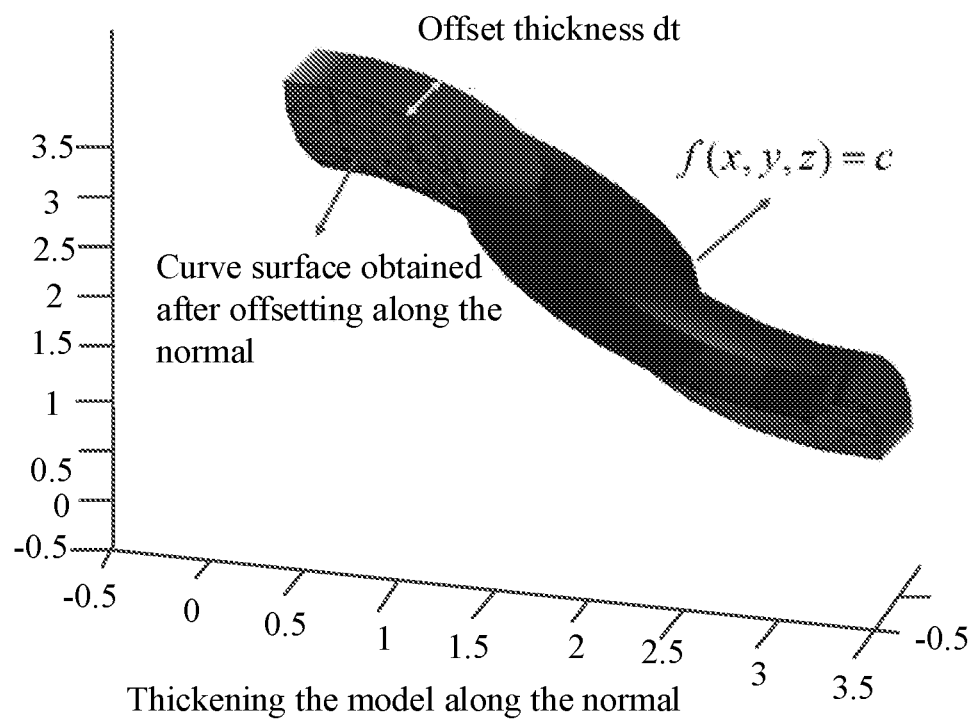
FIG. 1B is a schematic diagram showing the principle of generating the 3D printing model of the grinding block unit cell corresponding to the mathematical function Gyroid according to one embodiment of the present disclosure.
Figure 1C:
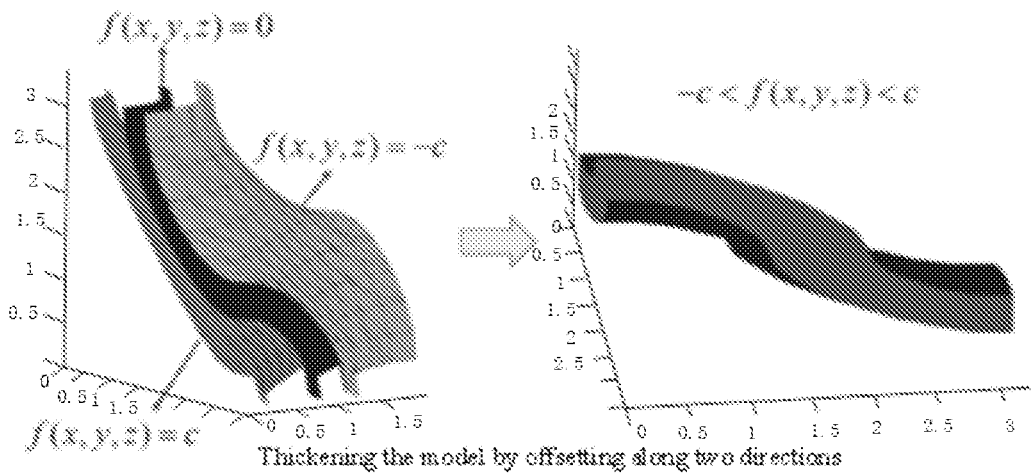
FIG. 1C is a schematic diagram showing the principle of generating the 3D printing model of the grinding block unit cell corresponding to the mathematical function Gyroid according to one embodiment of the present disclosure.

As shown in FIGS. 1A-1C, a method of generating a model structure corresponding to the mathematical function Gyroid comprises following steps.

1: A cube point set is established according to predetermined value ranges of x, y, and z. An equivalent surface is obtained by an isosurface function according to a curved surface expression.

Namely, an isosurface function of a MATLAB software is used.

2: Since the model structure meeting 3D printing requirements must be a closed 3D model, while a model in an STL format only comprise a housing and is not closed, the 3D model of the grinding block unit cell in an STL format is further combined with the an isocaps function.

3: Different periodic arrangements of the 3D model of the grinding block unit cell are achieved by changing the predetermined value ranges of x, y, and z. The larger an incremental step (that is, a total number of intervals between −x and x), the finer a grid of the model of the grinding block unit.

4: The 3D model of the grinding block unit cell is saved in the STL format.

5: Using the Gyroid function to establish the 3D printing model of the grinding block unit cell with the porosity of 0.3-0.8. Specifically, $$\sin\left(\frac{2\pi}{a}\cdot x\right)\cos\left(\frac{2\pi}{a}\cdot y\right)+\sin\left(\frac{2\pi}{a}\cdot y\right)\cos\left(\frac{2\pi}{a}\cdot z\right)+\sin\left(\frac{2\pi}{a}\cdot z\right)\cos\left(\frac{2\pi}{a}\cdot x\right)=t$$

Where a is the size of the grinding block unit cell and t represents a relative density thereof.

Figure 2:
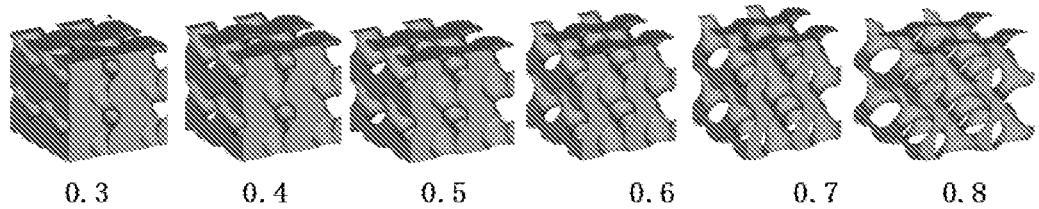
FIG. 2 is a structural schematic diagram of the 3D printing model of the grinding block unit cell having a porosity of 0.3-0.8 according to one embodiment of the present disclosure.

Codes entered in the MATLAB software is as follows:

$f=@(x,y,z)\sin(x)\cdot{}^*\cos(y)+\sin(y)\cdot{}^*\cos(z)+\sin(z)\cdot{}^*\cos(x);$ $c=(\text{porosity}-0.501)/0.333;$ pos='above';

The structure of the grinding block unit cell with the porosity of 0.3-0.8 is as shown in FIG. 2. The porosity of the grinding block unit cell is adjusted according to processing conditions (such as a size of abrasive debris and a flowing space of the cooling liquid).

Figure 3:
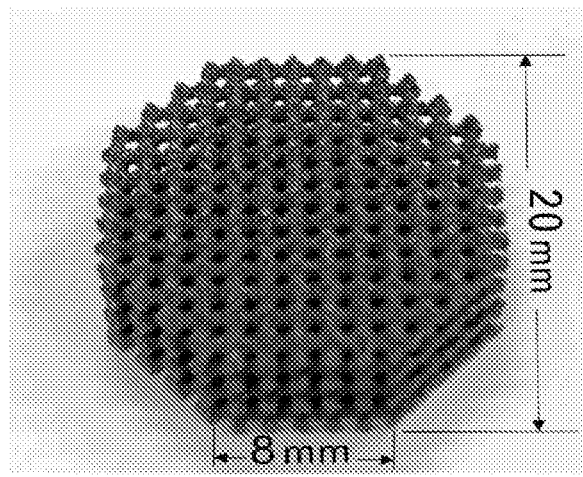
FIG. 3 is a structural schematic diagram of a diamond porous grinding block assembled by grinding block unit cells according to one embodiment of the present disclosure.

As shown in FIG. 3, the 3D printing models of the grinding block unit cells are built up to form the 3D printing model of the diamond porous grinding block by the print debugging software (i.e., the MAGICS software).

Specifically, the tool creation command in the task menu bar of the MAGICS software is adopted to create the frame of the diamond porous grinding block. The frame of the diamond porous grinding block is the hexahedron, the octahedron, the dodecahedron, or etc. Then, the structure of the 3D printing models of the grinding block unit cells is selected and imported into the MAGICS software. Finally, the size of the frame of the diamond porous grinding block is determined and the 3D printing models of grinding block unit cells are filled in the frame of the diamond porous grinding block to obtain the 3D printing model of the diamond porous grinding block. The 3D printing model of diamond porous grinding block is printed by the SLM technology to obtain one diamond porous grinding block, and then the plurality of diamond porous grinding blocks are built up to form the diamond structure grinding disc for grinding the semiconductor substrate.

A 3D printing process adopted to make the diamond structure grinding disc is the SLM technology. A laser power of the SLM technology is 300 W. A scanning speed is 3000 mm/s. A scanning interval is 120 μm. A spot diameter is 80 μm.

Printing powder for laser printing the diamond porous grinding block is mixed powder of diamond abrasive particles (an average particle size of the diamond abrasive particles is 60 μm) and AlSi$_7$Mg (which is an aluminum alloy binder). A volume fraction of the diamond abrasive particles is 15%. A volume fraction of AlSi$_7$Mg is 85%. A powder mixing device is a 3D printing metal powder mixing device. The diamond abrasive particles and AlSi$_7$Mg are prepared into the mixed powder for 3D printing by mechanical mixing, and a mixing time is 11 hours. A powder drying device is a vacuum drying oven. A drying temperature is 90° C. A drying time is 11 hours, which meets powder fluidity requirements of printing and manufacturing.

Figure 4:
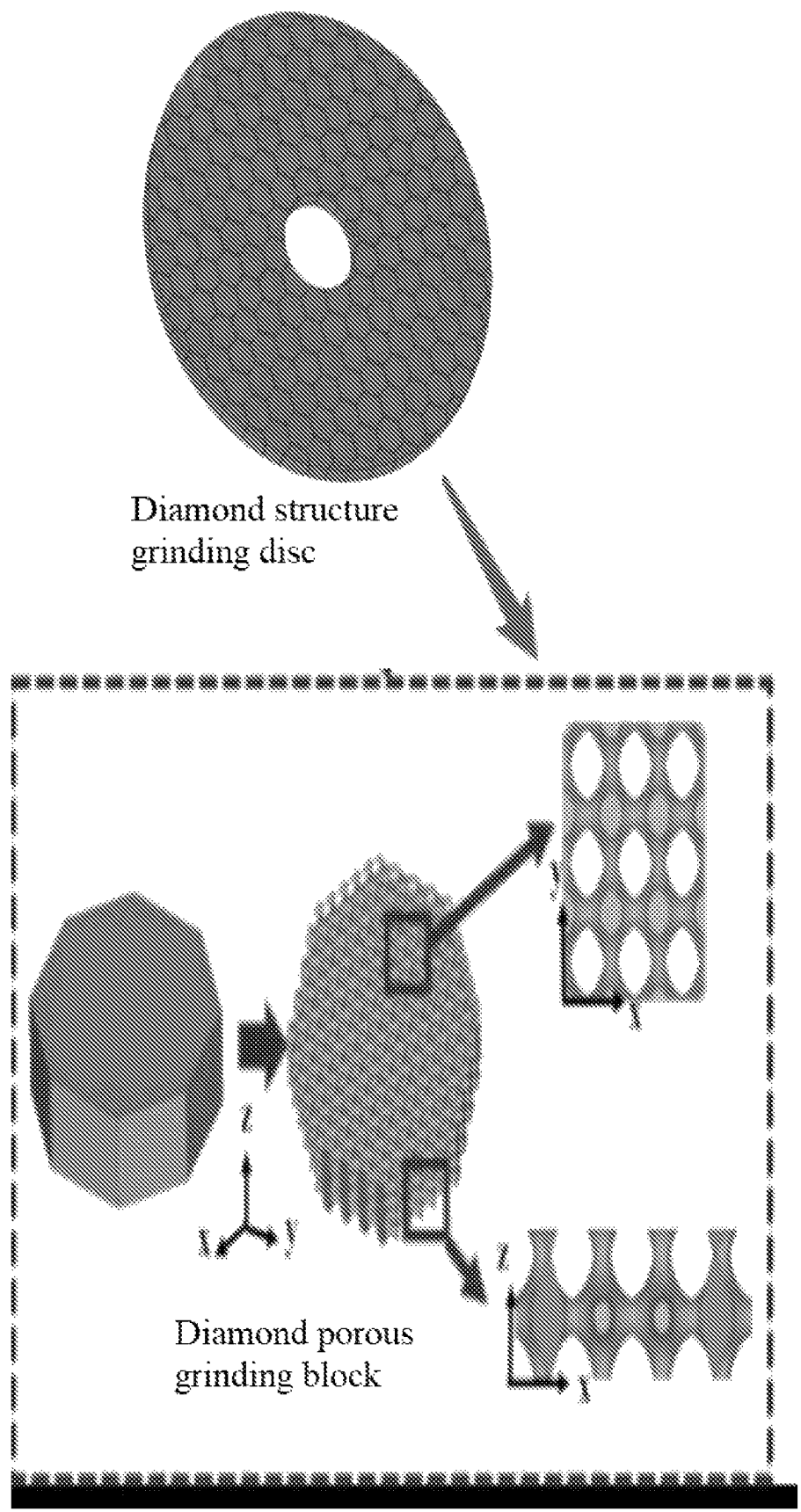
FIG. 4 is a schematic diagram showing a principle of forming a diamond structure grinding disc for grinding a semiconductor substrate according to one embodiment of the present disclosure.

As shown in FIG. 4, printed diamond porous grinding blocks are assembled to form the diamond structure grinding disc for grinding the semiconductor substrate based on 3D printing.

The foregoing embodiments are only configured to further illustrate a manufacturing method of a diamond porous grinding block based on 3D printing and an application thereof of the present disclosure, and the present disclosure is not limited to the embodiments. Any simple modifications, equivalent changes, and modifications based on the present disclosure fall within the protection scope of technical solutions of the present disclosure.

What is claimed is:

1. A manufacturing method of a diamond porous grinding block based on three-dimensional (3D) printing, comprising:

S1: designing a porosity of a grinding block unit cell according to an internal cooling space for abrasive debris required in a grinding process, and obtaining a 3D printing model of the grinding block unit cell with the porosity by a designing software based on a mathematical function relationship;

S2: creating a frame of the diamond porous grinding block in an STL format file preparation software, filling the frame of the diamond porous grinding block with a plurality of 3D printing models of grinding block unit cells; determining a size of the frame of the diamond porous grinding block to obtain a 3D printing model of the diamond porous grinding block; and S3: preparing mixed powder of diamond abrasive particles and an aluminum alloy binder as printing powder, performing 3D printing to the 3D printing model of the diamond porous grinding block by a selective laser melting (SLM) technology;

wherein the steps S1 comprises:

S11: selecting a mathematical function Gyroid as a curved function for generating the 3D printing model of the grinding block unit cell; and modeling in a math software to obtain a 3D model of the grinding block unit cell with the porosity in an STL format; and S12: importing the 3D model of the grinding block unit cell in the STL format into a modeling software to obtain the 3D printing model of the grinding block unit cell;

wherein the porosity of the grinding block unit cell is 0.3-0.8; a volume fraction of the diamond abrasive particles is 10%-30%; a laser power of the SLM technology is 200-400 W; a scanning speed is 2500-3500 mm/s; a scanning interval is 100-150 μm; a spot diameter is 70-90 μm;

wherein in the step S3, an average particle size of the diamond abrasive particles is 40-80 μm; the aluminum alloy binder is AlSi$_7$Mg; the mixed powder is prepared by mechanical mixing the diamond abrasive particles with the aluminum alloy binder; a mixing time is 8-15 hours.

2. The manufacturing method according to claim 1, wherein the mixed powder is dried in a vacuum drying oven before 3D printing; a drying temperature is 80-100° C.; a drying time is 8-15 hours.

3. A diamond porous grinding block manufactured by the manufacturing method according to claim 1, comprising holes communicated with each other in a 3D space.

4. A diamond structure grinding disc for grinding a semiconductor substrate, comprising: a plurality of diamond porous grinding blocks according to claim 3; the plurality of diamond porous grinding blocks are built up to form the diamond structure grinding disc.

5. The diamond structure grinding disc according to claim 4, wherein each of the diamond porous grinding blocks is hexahedron, octahedron, or dodecahedron.

\* \* \* \* \*